Patented May 30, 1939

2,160,511

UNITED STATES PATENT OFFICE 2,160,511

RIBBON INK COMPOSITION

Samuel A. Neidich, Burlington, N. J.

No Drawing. Application December 22, 1936,
Serial No. 117,182

8 Claims. (Cl. 134—31)

This invention relates to ink compositions, and will be explained with particular relation to the manufacture of inks for coating, saturating or impregnating the ribbons of typewriting and other printing and manifolding mechanisms.

There are a large number of formulas for the compounding of inks for saturating typewriting machine ribbons, but irrespective of the formula used, other than that set forth in my co-pending application, Serial No. 51,202 filed November 23, 1935, on which the present invention is an improvement, the ribbons treated with inks prepared according to the formulas of commerce, deteriorate with age, or exposure to light or air, or to variations in temperature.

Typewriting ribbons subjected to such exposure, or on account of age, dry out due to chemical changes in the fluid content of the inks, the imprint becomes paler, the oil content present in all former typewriting ribbon inks, so far as I am aware, becomes rancid and sticky, and the characteristics of the ingredients change, all to the end that the ribbons fail to give satisfaction in use, and their length of service is shortened.

Because of these well-known disadvantages, some of which are apparently the result of oxidation of the ink ingredients, it is customary for dealers in typewriting machine ribbons, for instance, to dispose of their oldest stock of this commodity as soon as possible, to avoid the losses otherwise sustained by spoilage.

My invention, like that disclosed in my co-pending application, is designed to materially delay, if not wholly eliminate, the occurrence of the foregoing ills to which typewriting ribbons are subject through age and exposure, the present invention distinguishing from my prior invention by the use of a novel ingredient for inks, whereby to secure the desired results in a better manner, and retain the natural characteristics of the inks so compounded over a longer period than heretofore.

In the study, manufacture and testing of ribbon ink formulae embodying as one ingredient tri-cresyl phosphate, according to my prior invention, I was impressed with the need for another definite chemical ingredient as a substitute for the oleic acid, red oil or other similar oil-miscible acid heretofore used as a solvent for the aniline or basic color base. Such substitute should be of an oily nature, with a low surface tension, and which would not itself change in characteristics through a long period of time, when used in connection with the other ingredients of a ribbon ink. Such ingredient should not only improve the ink compound, but also eliminate a fruitful cause for the aforementioned ills to which typewriting ribbons were subject.

Continued consideration of this problem resulted in the discovery that the use of "diglycol laurate", in combination with tri-cresyl phosphate, and the usual coloring and toning ingredients produced a much improved ink wherein the advantages attained by the ink formula of my former application, were greatly enhanced.

"Diglycol laurate", as to its physical properties, is a thin, oily-feeling liquid, having both a low surface tension and low viscosity.

"Diglycol laurate" apparently possesses a slightly acid reaction which constitutes it a perfect solvent for color bases, and it can be relied upon to a far greater extent than "red oil" or oleic acid, for freedom from deterioration through longer periods of time, and for uniformity of product.

Thus, I have found that different lots of oleic acid contain residual stearic acid in varying amounts, and as a consequence, ribbon inks including this part as a major ingredient vary materially from an exact standard, and are not uniform.

An example of one formula for black ribbon inks compounded in accordance with this invention, contains the following ingredients and protions:

|  | Parts |
|---|---|
| Carbon black | 6 |
| Tri-cresyl phosphate | 15 |
| "Nigrosine" base | 9 |
| Diglycol laurate | 15 |

Obviously, the proportions of the above ingredients may be varied somewhat without materially affecting the compound.

Also it is obvious that if a ribbon ink of another color than black is to be compounded, the proper pigment and toning agent would be substituted for the carbon black and the "Nigrosine" base. For instance, if a purple record is desired, a purple lake would be substituted for the carbon black of the above sample formula, and Methyl Violet base substituted for the "Nigrosine" base; or for a blue record, a Prussian or "Milori" Blue pigment would be ued in place of the carbon black, and a "Victoria" Blue toning agent used in place of the "Nigrosine" base.

It will be understood that in making these substitutions for obtaining different colored ribbon inks, slight changes may be made in the particular proportions heretofore stated, to obtain the best compound.

The ingredients are thoroughly mixed and ground in any convenient mill according to well-known methods, the process of compounding forming no part of the present invention.

From actual tests made from many ribbons treated with inks compounded in accordance with the foregoing formula, I have proven that ribbon inks including diglycol laurate as an ingredient give a more intense and sharper "write" than that made with ribbons treated with a variety of inks which do not include diglycol laurate as an ingredient. Also the durability and life of the ribbon as well as the speed of recuperation, that is, the transfer of ink by capillary action from the unused to the used areas of the ribbons, are all greatly increased.

Furthermore, it is evident from an inspection of the typical formula, that the compounded ribbon ink is wholly free from oil.

The aniline color bases or toning agents are treated with diglycol laurate in place of oleic acid, which acts as a solvent therefor, the result being a strong, oily solution of the particular color readily miscible with the pigment and tri-cresyl phosphate, and enabling a complete dispersion of the pigment uniformly throughout the fluid while being compounded.

One attribute possessed by the herein disclosed invention in ribbon inks, and one which I believe to be wholly novel, so far as I am aware, is its ability to effect a "write" on the sheets, laminated or otherwise, used in the comparatively recently developed process of lithographing from non-metallic lithographic plates, so as to enable a satisfactory lithograph image to be made therefrom.

In this process, it has been attempted, heretofore without success, to typewrite the material to be lithographed, directly upon a non-metallic lithograph plate through the use of the ordinary ribbons of commerce. By the use of ribbons treated with a ribbon ink compounded in accordance with the herein-described ingredients, most satisfactory lithographic impressions were made directly from the typewriting machine onto the non-metallic or paper plate without difficulty.

The tricresyl phosphate is used in such an amount as to serve as a vehicle for the finely ground pigment suspended therein, and the diglycol laurate is used for the purpose, among others, of dissolving the basic color base, and for rendering the ink suitable for use in forming lithographic images on non-metallic plates from which a far larger number of reproductions can be made than heretofore with other inks.

The diglycol laurate is also used in quantity sufficient to serve as a part vehicle for the pigment.

What is claimed as new, is:

1. A ribbon ink, the ingredients of which include a finely divided pigment suspended in tricresyl phosphate, and a basic color base dissolved in diglycol laurate.

2. A ribbon ink composed of approximately 15 parts of tricresyl phosphate; 6 parts of a pigment of the desired color; 9 parts of a toning base to intensify the color of the pigment; and 15 parts of diglycol laurate as a solvent for the toning base.

3. A ribbon ink for forming lithographic images on a non-metallic plate, including as ingredients, diglycol laurate to function as a solvent for a dye base, and tricresyl phosphate in an amount sufficient to function as a vehicle for a pigment of the desired color, and dyed with the base of a basic dye stuff soluble in the diglycol laurate.

4. An ink for forming lithographic images on a non-metallic plate, which ink resists the chemical treatment usual in the lithographing art to render the uninked surface of the plate ink-repellant and water absorbent, the ink composed of tricresyl phosphate; a pigment suspended therein; and the base of a basic dye stuff dissolved in diglycol laurate which has a slight acid reaction.

5. An ink for use in forming lithographic images on non-metallic lithograph plates, comprising a pigment; tricresyl phosphate in quantity sufficient to serve as a vehicle for the pigment, and being a viscous non-drying fluid having lubricity and resistant to deterioration by exposure to atmospheric changes, heat, light and humidity; a suitable basic color base; and diglycol laurate in quantity sufficient to serve as a solvent for the dye base, and also functioning to increase the number of reproductions obtainable from a non-metallic lithographic plate, and as a part vehicle for the pigment.

6. A ribbon ink compound containing finely ground pigment of the desired color; tricresyl phosphate, as a non-drying vehicle, in an amount to serve as a carrier for the pigment suspended therein; and a basic color base dissolved in diglycol laurate.

7. A ribbon ink compound containing a finely ground pigment of the desired color; tricresyl phosphate, as an oilless vehicle, in an amount sufficient to function as a carrier for the pigment suspended therein; and a toning basic color base dissolved in diglycol laurate.

8. An oilless ribbon ink comprising a finely divided pigment; tricresyl phosphate, as a non-drying, oilless vehicle, in an amount sufficient to function as a carrier for the pigment suspended therein; and modified in color by the addition of a basic dye base dissolved in diglycol laurate in an amount sufficient to function as a solvent for the basic dye base and having the function of developing the tinctorial properties of the basic dye base.

SAMUEL A. NEIDICH.